May 23, 1961  G. L. COX, JR., ET AL  2,984,861
BALLING DRUM
Filed Dec. 7, 1959
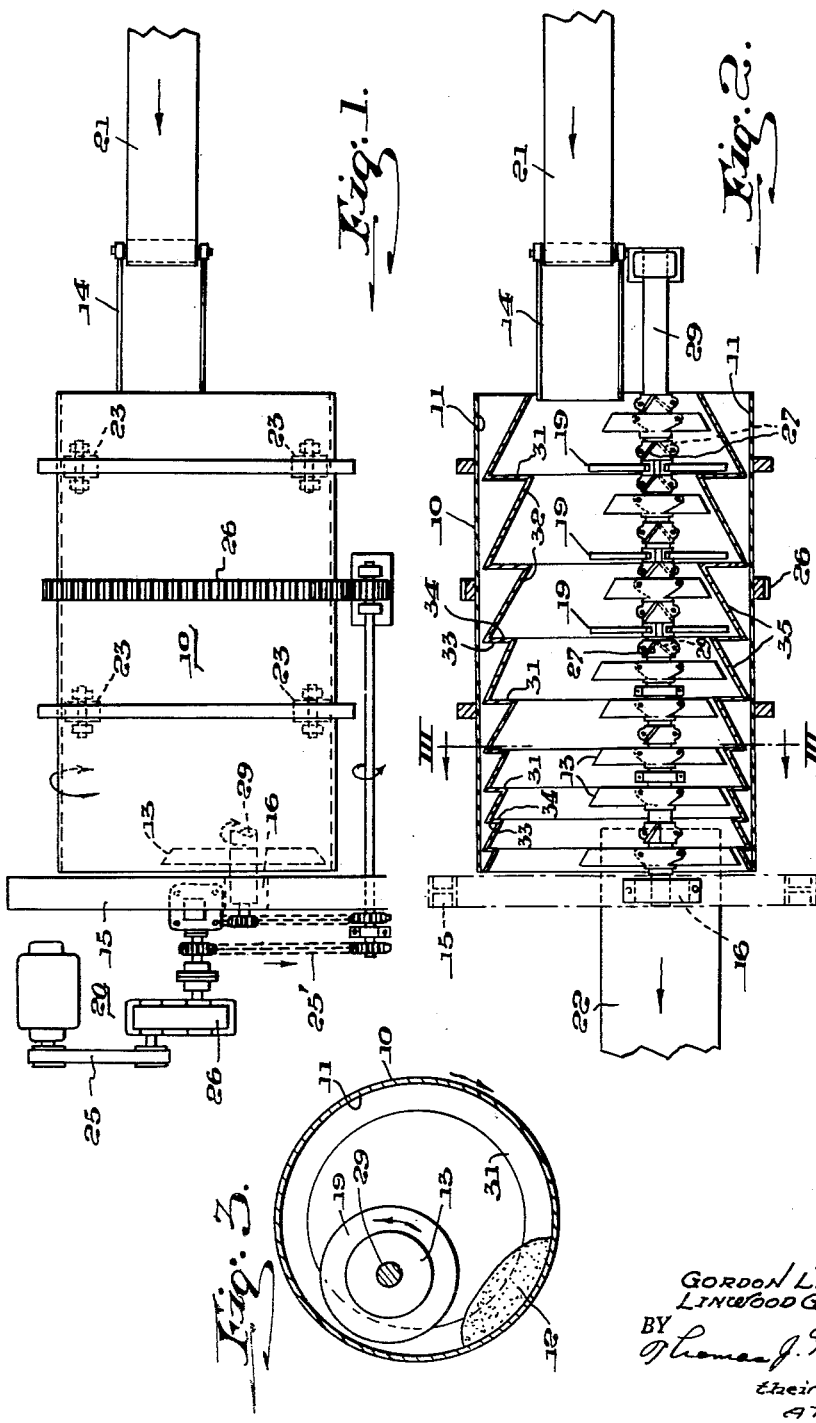
INVENTORS.
GORDON L. COX, JR.
LINWOOD G. TUCKER, JR.
BY Thomas J. P. O'Brien
their ATTORNEY United States Patent Office 2,984,861
Patented May 23, 1961

2,984,861

BALLING DRUM

Gordon L. Cox, Jr., and Linwood G. Tucker, Jr., Pittsburgh, Pa., assignors to Koppers Company, Inc., a corporation of Delaware Filed Dec. 7, 1959, Ser. No. 857,681

7 Claims. (Cl. 18—1)

This invention relates to improvements in rotary drums for pelletizing finely-divided material such as iron ore, ore concentrates, flue dust and fly ash, and more particularly, to improvements in the drum type apparatus of the common assignee's copending Harold T. Stirling application Serial No. 760,265, filed September 10, 1958, now U.S. Patent No. 2,920,344, and entitled "Balling Drum," of which the present improvement is a continuation-in-part.

The main object of the present invention is to adapt and perfect said Stirling drum apparatus to attain the same result thereof with certain other kinds or sources of material which are so wet or sticky that the material which otherwise could be processed in said Stirling drum system, with the intended movement of the feed material through the drum at a uniform rate, cannot be so processed because of hangups, or excessive buildup on the inside surface of the pelletizer, which causes the material to back up in the feed inlet to the drum, as well as causing undesired larger sized agglomerates to so form in the feed of the drum as to require screening out of a major or substantial portion of the feed at the discharge end before conveying the final product to the sintering system, thus disadvantageously reducing the capacity of the pelletizer system for its intended purpose of once through operation without recycling.

The improved apparatus of said Stirling application is especially designed and adapted for balling said wet or moistened finely-divided material into firm, coherent pellets and balls while devoid of other binders, as well as materials which might have, or require, an agglutinating substance, for the purpose of forming pellets and balls to provide beds of high gas permeability suitable for high speed sintering of agglomerates into cake form to produce a rigid, firm, dust-free product from the sinter cake.

The Stirling drum system provides a simple, more economical, and facile way of attaining the same throughput or capacity, without recycling of fines, from such rotary drum systems as is attained in the operation of said drums as theretofore with recycling of fines, to nodulize fines without a binder other than water into pellets or balls which give a bed of high gas permeability suitable for sintering into a coherent agglomerated cake mass.

In sintering of the fines in continuous endless conveyor type sintering machines, it is desirable to nodulize or pelletize the fines before laying them onto the sinter strand in order to provide a layer or mass which is permeable to the throughflow of the gas or flame. Most materials can be nodulized with water as the sole binder since they contain inherent properties such that when wetted, the balls produced become of such great density, that they retain their shape and the desired bed permeability, even after the moisture has been driven off, but some other materials have characteristics which make it necessary to add in addition to water an agglomerating agent in order to attain the same effect. Beds so formed give a sintering layer of high permeability which permit high rates of sintering with a minimum of re-runs or hot returns.

With such very high rate of sintering speed, the nodules must be prepared and supplied to the sinter strand as they are freshly formed and at a rate sufficiently fast to maintain the continuity of a sintering layer at all times over the sinter strand.

This has sometimes necessitated in the art prior to said Stirling system the recycling of a larger portion of fines which might even approach as much as the end product of the rotary drum. As a result of this high volume of fines in such drums to maintain the output of properly sized nodules in the quantity required, much of the fresh fine material introduced at the inlet of the drums escapes as fines or as balls or pellets of improper size, which must be classified or screened from the main product leaving the drums for delivery to the sintering machines. The capacity or throughput of these balling drums is thus limited by such fines unless special provisions are taken to recycle these fines back into the feed end of the drum to agglomerate them onto new nodules being formed with the fresh feed material, or as seed particles for initiating the balling action of the fines. When these steps are taken the throughput or capacity of the drums is increased in respect of finished, firm, coherent nodules suitable to maintain the required continuity of operation of the sinter strand for such agglomerated fines.

In accordance with said Stirling invention, the required throughput or capacity of operation is attained in simpler, more economical, and facile way by means which avoid the discharge of fines from the discharge ends of such drums along with the nodules to be delivered to the sinter strand, thus eliminating the difficulties and disadvantages of recycling fines to attain the rated capacity of the drums.

Accordingly, the said Stirling drum invention provides for this purpose a conventional rotary drum that is operable about a generally horizontal axis, that is at an angle to the vertical, and has radially extending annular baffles that project at spaced intervals along the drum from the inner circumference of the drum toward its axis of rotation in planes at right angles to said axis to provide for simulation in the drum of the tumbling and nodulizing action of the conventional disc pelletizer at repeated intervals along the drum from the feed inlet to the nodule discharge outlet from the drum. Annular deflectors are disposed each on an incline from a region closer to the axis of rotation on the downstream side of each baffle to a point more remote from the axis of rotation of the drum on the upstream side of a next baffle in the direction of the discharge end of the drum. The baffles are of progressively greater height along the drum from the discharge end toward the feed end, and the spacing between the baffles decrease progressively from the feed end toward the discharge end to provide for longer retention times of the fines in the areas along the drum nearer the feed end than in those areas further along toward the discharge end. Conventional means for feeding wet fine particles are disposed to feed the same to the drum at its end having the wider spaces and the longer baffles, and conventional means for discharge of the nodules are provided at the opposite end of the drum having the shorter baffles.

This simple arrangement of baffles requires a greater portion of the fines to reside in, and remain longer in, the entrance end areas than in the areas further along toward the discharge end until they become more firmly attached as coherent parts of nodules of a size to pass over the baffles before the fine particles can pass from each baffle to the space between it and the next, so that a decreasing amount of fines ultimately reach the after baffles along the drum. As a consequence, only firm coherent nodules reach the discharge end. Screens for classifying the discharge nodules are unnecessary, the recycling steps and equipment eliminated.

A further important feature of the Stirling invention is the angle or pitch of the deflector. A pitch inclusive of 25° and below 50° for the deflectors has been found effective for balling each of the materials of the group of light finely-divided material, fly ash, waste glass grinding effluent, and some kinds of iron ore mixtures, and up to 40° to 50° has been found satisfactory for the heavier material, such as iron ore mixtures. The degree of pitch of these deflector plates will vary according to the physical characteristics and nature of the particular material being processed in the drum. In general, a pitch of 34° has been found effective for best mode of operation in processing each of the aforesaid materials.

In operation with the rotary axis of the drum in a true horizontal plane, the drum operates as a series of pseudo disc pelletizers without stress or strain on the bearings as occur with the drum elevated at one end to operate on an incline to the normal or horizontal position. In such horizontal plane the deflectors function as the incline plane of a disc pelletizer. In the elevated inclined position of the drum the deflectors may be omitted since then the inclined plane of the drum's inner circumference acts to function in the same manner as the rotating inclined plane of a conventional disc pelletizer. However, the deflectors are also of utility in such inclined operation of the drum, since then the greater inclination afforded avoids degradation of the nodules and results in faster throughput with a minimum of fines.

The Stirling invention thus is not limited in all its aspects to the use of the deflectors with the radial right angular baffles in increasingly greater depth in direction from the discharge end to the feed end. Also the decrease in spacing in the direction of the discharge end is not essential to all the aspects of the novel coaction of the invention of such baffle gradation, in reducing the amount of fines reaching the discharge end.

In general, the Stirling system operates satisfactorily with most materials of the type specified, but with others which are very wet or constitute a sticky mix, such as is available at Provo, Utah, the material in the feed end builds upon the scrapers and thus offers resistance to the mix on the inclined deflectors until large lumps form which drop back to the rolling pelletizing area in the lower part of the drum. This material then does not pass on to the next section, but instead, holds back the entering feed choking the inlet means to the drum. The inclined deflectors and their scrapers, which are mounted immovably on a large central rod, collect the mix rather than cause the material to drop freely therefrom to the rolling area. Reciprocable spaced scrapers, and reversely rotating helical members, which would avoid this buildup of the material, cannot be used, since the inclined conical deflectors do not lend themselves to scraping in these manners.

According to the present invention, it has been found that the cause of the difficulty, was that the material being treated, built a heavy clay-like coating on the deflectors and baffles which was not readily continuously removed by stationary scrapers. This material tended to form a clay-like surface that compacts to such an extent that it resembles concrete producing great friction between the drum and knife edge. This also prevents the required uniform rate of flow without hangups and excessive buildup at the feeding end of the drum. By utilizing revolving spaced cutters in the form of cutting blades, immovable lengthwise of the drum, for each inclined annular or conical deflector at the feed end of the drum, with the pitch of the blades set at an acute angle to their axis of rotation, which causes the scraped off material to advance along the drum, the required uniform rate of flow without hangups or excessive buildup inside the drum on the baffles and deflectors, can be attained also with this sticky mix in the manner contemplated by the Stirling drum system.

Such cutters also minimize the resistance to material being scraped off the drum surfaces and also prevent material from collecting on the cutters. These cutters have been found satisfactory to maintain the feed of material at a uniform rate. Because of the high peripheral speed of the cutters, they remain clean and keep the surface of the drum scraped free of excessive material, and are each supported immovably lengthwise of the drum on a common rotatable support extending longitudinally of the drum interior and thus avoid buildup of the scraped or cut material on the cutters and in the feed end of the drum. With this system, plows or scoops are no longer necessary to maintain the continuous throughflow.

The cutting edges of the cutters are set on an angle to coincide with the deflectors and the cutters, themselves, are set at an acute angle, preferably 45° to their axes of rotation, to advance the cut material through the drum.

With these cutters, the excessively wet or sticky mix can be processed according to the Stirling system, with the drum tilted and the radial baffles all of the same inside diameter, and also with the drum tilted and the radial baffles progressively decreasing in height toward the discharge end of the drum, as well as with the drum truly horizontal and the radial baffles progressively decreasing in height toward the discharge end, as well as with equal spacing of the baffles and increasing height of the same toward the discharge end. Preferably, the cutters are provided for the first three deflectors, but may be used adjacent all of the deflectors throughout the entire length of the drum and rotary cutters are also provided for cutting or scraping material off of the baffles in the Stirling system.

Other objects and advantages of the invention will be apparent as it is better understood from the following description when considered in connection with the accompanying drawings illustrating the best mode of practicing the same:

Fig. 1 is a partial top plan view of a rotary drum embodying the best mode of the present invention;

Fig. 2 is a horizontal sectional view of the same taken through the upper part of the drum;

Fig. 3 is a vertical cross-sectional view taken on the line III—III of Fig. 1.

The same reference numerals are used for like parts in each of the several views.

Referring to the drawings, the improved balling drum 10 consists of a cylindrical, smooth, inner side shell 11, revolving deflector cutters 13, and baffle cutters 19, a chute feeder 14, and end casing 15 with a bottom discharge outlet 16, and a motor drive 20.

Wet fines and sticky mix are fed to the chute 14 by an endless belt conveyor 21 and the finished nodulized product conveyed from the outlet 16 to feeder pans or other layering means for a continuous endless strand sintering machine by an endless conveyor 22.

The drum rotates on idler rolls 23 and is driven by the motor 24 through a driving mechanism in the form of a belt 25, a chain 25' and gearing 26. The cutters 13 and 19 are carried by rotary shaft 29 as a common support. The shaft 29 is interconnected with the motor drive 20, or a separate motor to drive the cutters 13, 19. The cutters, when adjusted, are then operated in a fixed position relative to the axis of the rotating drum.

The general aim of the drum is to simulate the action of a conventional disc pelletizer at successive intervals along the drum from the inlet to the outlet. This is attained by having the baffles 31 set annularly in transverse planes that are in general wholly in a plane at right angles to the longitudinal axis of rotation of the drum, rather than at an acute angle, such as a spiral or serpentine baffle as in a customary balling drum or pugging drum.

In movable grate sintering, it is more desirable to have a high bed permeability, as high as is possible, in order to promote the highest possible amount of draft, as well as uniform distribution of that draft. One of the most important factors which influence bed permeability is the sizing of feed to the sinter strand. Naturally, the larger and more uniform the sizing of feed, the more open and permeable will be the bed.

It is evident that the mixing and preparation of the feed for a sintering machine is of vital importance to the whole sintering operation. In most movable grate sintering operations, the raw materials are mixed with the proper amount of water in either a balling drum, a pugging drum, or on a disc pelletizer. In all cases, the principal object is to produce pellets or balls of the raw material which are as uniform in size as is possible, in order to have uniform air flow for uniform sintering.

The balling drum or pugging drum are much the same in operation, in that they both depend upon the tumbling action of a revolving drum to mix and ball up the material during its passage through the drum. In the pugging drum, rotating paddles are also provided to further insure adequate mixing of the raw material and to move it through the drum.

The pelletizing disc is nothing more than an inclined revolving disc equipped with plows. The dry material is charged to the center of the disc and as it moves toward the outside, is mixed with water and balled up.

The conventional balling drum or pugging mill has several advantages over the pelletizing disc, most particularly, their higher throughput capacity. They have one great disadvantage, however, in that neither produce pellets of uniform size, making it sometimes necessary to screen out the fines in order to promote maximum bed permeability. The disc pelletizer is capable of producing pellets of more or less uniform size without screening. In addition to being of low capacity, the disc is mounted on a single central spindle and, because of the high rotating speeds, maintenance costs are much higher than those for a balling or pugging drum.

With the disc pelletizer, the revolution of the disc, plus the scraping action of the plow, causes the tumbling action that is conducive to good balling. As the balls increase in size and weight, centrifugal force tends to throw them toward the outside rim while the fines continue to remain in about the same location or even tend to move toward the center. Gradually, the formed balls reach sufficient size and weight that they move to the edge of the disc and are discharged over the rim. The diameter of the disc, its angle of inclination, and its speed of revolution, can be suitably adjusted to control the degree of balling that is attained. In essence, all that the adjustment of these variables does is to change the retention time on the disc. The ability to control retention time, plus the particular type of tumbling action that is induced by the revolution of the disc, is felt to be the reason for the superior action of a disc pelletizer as compared to a conventional balling drum without baffles.

The employment of the baffles 31 at right angles to the general line of the axis of rotation of the drum 10, with the baffles 31 disposed annularly at spaced intervals along the inner surface 11 of the drum, results in the baffles 31 in the drums retarding the flow of material and including sufficient tumbling action as in the disc pelletizer, that is, to ball the material to the desired predetermined condition most suitable for sintering on a movable grate, while at the same time attaining the characteristic higher throughput or capacity of the ordinary balling drum or pugging drum without baffles, or with baffles in a spiral plane which tend to favor the flow of fines through the drum.

Thus, the material is made to flow through a number of, for instance six, pseudo disc pelletizers 31 as it passes through the drum. Observation of the material during actual operation of the drum, tends to show that the action is like that of a disc pelletizer. That is, as the material enters a baffle section 31, the larger, heavier balls rapidly roll down the inclined drum surface or an inclined deflector plate 32, when employed between each two baffles 31, to be discharged into the next section 31 while the fines continue to move much more slowly down the inclined surface 32 and sometimes even appear to move back up such inclined surface 32.

With this Stirling drum system, it is possible to achieve, in an inclined drum without recycling of fines, the same satisfactory balling action for sintering machines, with one type of sintering material, but not with various types of sinterable material, as is obtained with a series of conventional disc pelletizers but with the same higher capacity or throughput with recycling of fines, as in the conventional balling drums and pugging drums, with a retention time of 60 to 90 seconds. This was done with the baffles 31 spaced equally distant from each other along the inclined drum at succeeding 24 inch intervals and with the baffles 31 all of equal height of 3 inches each, and in a commercial installation the downdraft section in a sintering machine was decreased from 35 to 38 inches of water prior to the installation of the 3 inch high baffles to 25 to 27 inches of water with the aforementioned baffles equally spaced at 24 inch intervals.

With the various other types of sinterable material, it was found that with the drum operating in either an inclined or horizontal position, the balls produced were of more fragile nature and tended to disintegrate in flowing over the baffles, resulting in an excessive amount of fines for low bed permeability on the sintering machine, and made recycling of fines necessary to achieve the aforesaid full rate of capacity. In order to overcome the excessive production of fines and to avoid the difficulties and disadvantages of recycling the fines, it was first found this could be achieved in part with these other materials by means of the deflector 32 between the downstream sides 33 of the baffle 31 and a lower region of the upstream side 34 of each baffle 31, as shown on the drawing. It was ascertained that the deflectors would aid in reducing the amount of fines formed which must be recycled since, when optimum moisture for optimum balling was added, it was found that as the formed pellets flowed over the baffles 31 without the deflectors, there was a slight breakdown of pellets, as a result of the fall. This partial degradation of the pellets is overcome by the deflector plates 32 on the downstream sides 33 of the baffles.

In accordance with the present invention, with the baffles 31 decreased in height, so that they decrease in height about one-half inch each progressively from the feed inlet end 14 of the drum 11 to the discharge outlet end 16 of the drum, and the baffles 31 spaced apart from each other lengthwise of the drum 11 in decreasing amounts, such as those indicated on the drawing, from feed inlet end 14 to the discharge outlet end 16, and with the angle of inclination 35 at which the deflectors 32 set in relation to the drum inner circumference 11 between 25° and 50°, the formation from the aforesaid excessively wet material or a sticky mix of firm coherent nodules of the desired uniform size and degree of permeability for sintering machine gases, is maintained at the same full rate of capacity without buildup of material in the feed end 14 as heretofore devised by Stirling for the same purpose of continuously supplying nodules for sintering on continuous sinter strand types of ore pellet sintering machines, by the novel arrangement of cutters 13 and 19. The coaction of rotating baffle cutters 19 and acute angle blades as rotating deflector cutters 13, with the downstream deflectors pitched at 25°–50°, has been found to be the best mode of construction, not only because balling is satisfactory with both coarse and fine materials, as well as the aforesaid excessively wet material or a sticky mix, but also because it is possible to produce a satisfactory product while operating in the horizontal position, which is more advantageous than operation in the inclined position at an angle to the vertical, since the latter involves special engineering and construction to accommodate the thrust on thrust bearings at the lower end of the drum to minimize maintenance and upkeep costs on the driving mechanism.

The balls produced are all of such uniform size that no screening out of fines is necessary, as has been the case with other types of balling drums. The production rate is maintained without resort to recycling of fines for "seeding" of pellets. Production rates up to 1.0 ton per hour per square foot of drum surface are attainable, but a rate between 0.6 and 0.8 ton per hour per square foot of drum surface is deemed to be the rate at which optimum balling takes place. The product produced is one in which its layer permeability is such that in a 12 inch pot test the average air flow increased from 81.5 cubic feet per minute for material prepared in a conventional balling drum without baffles to 108.2 cubic feet per minute for the same material prepared in the drum of this invention with the variously spaced sloping deflectors. This increase in air flow by 32.7% is indicative of the increased permeability that is achieved through the use of the balling drum improved as described above.

In operation with excessively wet material or a sticky mix as aforesaid, as well as with glass grinding effluent material, fly ash, and iron ore concentrates, the material in the wet condition for balling is fed from the belt 21 into the chute 14 which flows the wet material onto the first deflector 32 during rotation of the drum. The material tumbles there as in a disc pelletizer until it balls up to sizes large enough to flow over the radial baffles 31, whence it descends by gravity along the next deflector, and so on through all sections 31. The retention time of the fines is long enough in the forepart areas so that the amount of fines decrease from section to section until the last section passes only nodules devoid of loose fines. The dimensions of the drum, its speed of rotation, its degree of inclination, and types, size, and spacing, and height of the baffles 31, are all variable, depending upon the desired throughput capacity and balling characteristics of the particular materials to be processed. The general operating principal of any modification of the drum is that the baffles are so designed and located to retard the flow of material and induce sufficient tumbling action to ball the material to the desired predetermined condition that is most suitable for sintering on a movable grate.

With the aforesaid wetter material or sticky mix, the cutters 13, 19 do not collect the scraped material, but it falls freely to the lower part of the drum as fast as the material is scraped from the upstream sides of the baffles 31 and from the inner faces of the annular conical deflectors 32.

The rotating deflector cuter blades 13 are disposed in angularly spaced relation to each other around their drive shaft to reduce the instantaneous torque on the cutter drive shaft, both by their multiplicity for the wider deflectors 32 and by their regular arrangement 27 of 90°, or any other successive even change in phase from each other in their successive individual locations along the shaft. By reason of this multiplicity and 90° angular displacement, the instantaneous frictional force against the deflectors 32, and hence, the force transmitted to the drum, is also decreased.

The additional right angularly disposed baffle cutters 19 serve to cut any adhering material on the baffles.

With the drum rotating clockwise as viewed in Figure 1, looking from the direction of the feed end along the sectional line III—III, the rotary cutters 13, 19 are mounted to rotate counterclockwise and the shaft is in the positon between nine o'clock and twelve o'clock (i.e., 270° to 360° from the vertical), preferably between ten o'clock and eleven o'clock.

The deflector cutting blades 13 are disposed at an acute angle, preferably 45°, to their axis of rotation in a position to cause the scraped material to move forward downstream in the drum, as the material falls to the lower rolling pelletizing area in the drum to maintain the continuity of flow at the desired throughput without the use of plows as shown in the Stirling system.

The cutters 13 and 19 are mounted for rotation in a direction opposite to the direction of rotation of the drum, within the region of the drum between 270° and 360° from the top of the drum, and preferably in the 300° to 330° sector, to insure fall of only small, rather than very large, lumps or particles into the pelletizing area 12 of the drum.

The cutters 19 are set to avoid excessive thrust pressure against the baffles 31.

The invention as hereinabove set forth is embodied in a particular form of construction but may be variously embodied within the scope of the claims hereinafter made.

We claim:

1. In a balling drum apparatus for agglomerating substantially spherical bodies of predetermined size from wet finely-divided material devoid of, or with, binder other than water, comprising: a drum mounted for rotation about its longitudinal axis in a plane at an angle to the vertical; means for supplying material into one end of the drum during rotation thereof; means for withdrawing nodules of said material from the opposite end of said drum during rotation thereof, radially extending annular baffles projecting inwardly, at spaced intervals along the drum from the inner circumference thereof towards its longitudinal axis of rotation with each baffle in a plane at a right angle to said axis to provide retardation of the flow of fine material along the length of the drum; annular deflectors each disposed on an incline from a region closer to the axis of rotation on the downstream side of each baffle to a point more remote from said axis on the upstream side of a next baffle in the direction of the discharge end of the drum with the deflectors inclined between the baffles with a pitch within the range of 25° and 50°, the improvement comprising: revolving deflector cutting blades in individual scraping relation with the deflectors between the baffles at the feed end of the drum, for keeping the surface of the deflectors scraped free of excessive material, each of the cutting blades being supported immovably lengthwise of the drum, from a common rotatable shaft extending longitudinally of the drum interior, in spaced relation to each other and disposed at an acute angle to their axes of rotation in position to cause the scraped material to move forward downstream in the drum as the material falls to the lower rolling pelletizing area in the drum, and means for rotating said shaft.

2. Apparatus as claimed in claim 1, and in which the cutter shaft is mounted to rotate in the opposite direction to the direction of rotation of the drum, between 270° and 360° from the top of the drum measured in the direction of rotation of the drum.

3. Apparatus as claimed in claim 2, and in which the cutter shaft is located in the 300° to 330° sector measured in the direction of rotation of the drum, to insure fall of only small particles into the pelletizing area.

4. Apparatus as claimed in claim 1, and in which a plurality of baffle cutting blades are provided for individual ones of said baffles at the feed end of the machine, alongside the upstream side of the baffles and set to rotate in a plane at right angles to the axis of the drum, to clean the baffles without excessive pressure against the baffles.

5. Apparatus as claimed in claim 1, and in which the cutting edges of the deflector cutting blades are set at an angle of 45° to the axis of the drum.

6. Apparatus as claimed in claim 1, and in which the annular deflectors are each disposed at a 34° pitch.

7. Apparatus as claimed in claim 1, and in which the spaces between the baffles decrease progressively from the feed end to the discharge end of the drum.

References Cited in the file of this patent

UNITED STATES PATENTS

| | | |
|---|---|---|
| 1,931,499 | Klugh | Oct. 24, 1933 |
| 2,311,154 | Carney | Feb. 16, 1943 |
| 2,726,068 | Howden | Dec. 6, 1955 |
| 2,831,210 | De Vaney | Apr. 22, 1958 |
| 2,920,344 | Stirling | Jan. 12, 1960 |
| 2,924,847 | Keiding et al. | Feb. 16, 1960 |